(12) United States Patent
Uchida et al.

(10) Patent No.: US 8,305,469 B2
(45) Date of Patent: Nov. 6, 2012

(54) IMAGE PICKUP APPARATUS HAVING A DUMMY SIGNAL READOUT CIRCUIT

(75) Inventors: Mineo Uchida, Yokohama (JP); Hideaki Takada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 334 days.

(21) Appl. No.: 12/523,898

(22) PCT Filed: Nov. 17, 2008

(86) PCT No.: PCT/JP2008/071187
§ 371 (c)(1),
(2), (4) Date: Jul. 21, 2009

(87) PCT Pub. No.: WO2009/066748
PCT Pub. Date: May 28, 2009

(65) Prior Publication Data
US 2010/0045827 A1 Feb. 25, 2010

(30) Foreign Application Priority Data
Nov. 19, 2007 (JP) .................... 2007-299651

(51) Int. Cl.
*H04N 9/64* (2006.01)
(52) U.S. Cl. ........................................ 348/245
(58) Field of Classification Search ............... 348/222.1, 348/241, 245
See application file for complete search history.

(56) References Cited

U.S. PATENT DOCUMENTS

| | | | | |
|---|---|---|---|---|
| 4,700,231 A | * | 10/1987 | Matsumoto | 348/245 |
| 6,037,577 A | * | 3/2000 | Tanaka et al. | 250/208.1 |
| 6,344,877 B1 | * | 2/2002 | Gowda et al. | 348/245 |
| 6,627,896 B1 | | 9/2003 | Hashimoto et al. | |
| 6,903,768 B1 | * | 6/2005 | Ohsawa et al. | 348/241 |
| 7,050,098 B2 | * | 5/2006 | Shirakawa et al. | 348/245 |
| 7,545,418 B2 | * | 6/2009 | Beck et al. | 348/241 |
| 2002/0140830 A1 | * | 10/2002 | Shirakawa et al. | 348/245 |
| 2006/0284988 A1 | * | 12/2006 | Wakui | 348/222.1 |
| 2008/0012966 A1 | * | 1/2008 | Beck et al. | 348/245 |

FOREIGN PATENT DOCUMENTS

| | | |
|---|---|---|
| JP | 08-031991 | 3/1996 |
| JP | 11-098414 | 4/1999 |
| JP | 2000-152098 | 5/2000 |
| JP | 2001-042042 | 2/2001 |
| JP | 2006-352758 | 12/2006 |

* cited by examiner

*Primary Examiner* — Nicholas Giles
(74) *Attorney, Agent, or Firm* — Cowan, Liebowitz & Latman, P.C.

(57) ABSTRACT

An image pickup apparatus is provided that is capable of obtaining a correction value effective for horizontal noise correction, while suppressing increase in chip area of an image pickup device. The image pickup apparatus includes an image pickup device (101) for converting an object image into electrical signals, and a correcting section for correcting a picked-up image. The image pickup device includes a pixel signal readout circuit (204) for reading out pixel signals from a pixel region on a line-by-line basis via vertical signal lines, a dummy signal readout circuit (209) for reading out dummy signals, and a horizontal transfer circuit (205) for transferring outputs of the pixel signal readout circuit and the dummy signal readout circuit. The correcting section corrects the outputs of the pixel signal readout circuit on a line-by-line basis using the outputs of the dummy signal readout circuit.

6 Claims, 15 Drawing Sheets

Prior Art

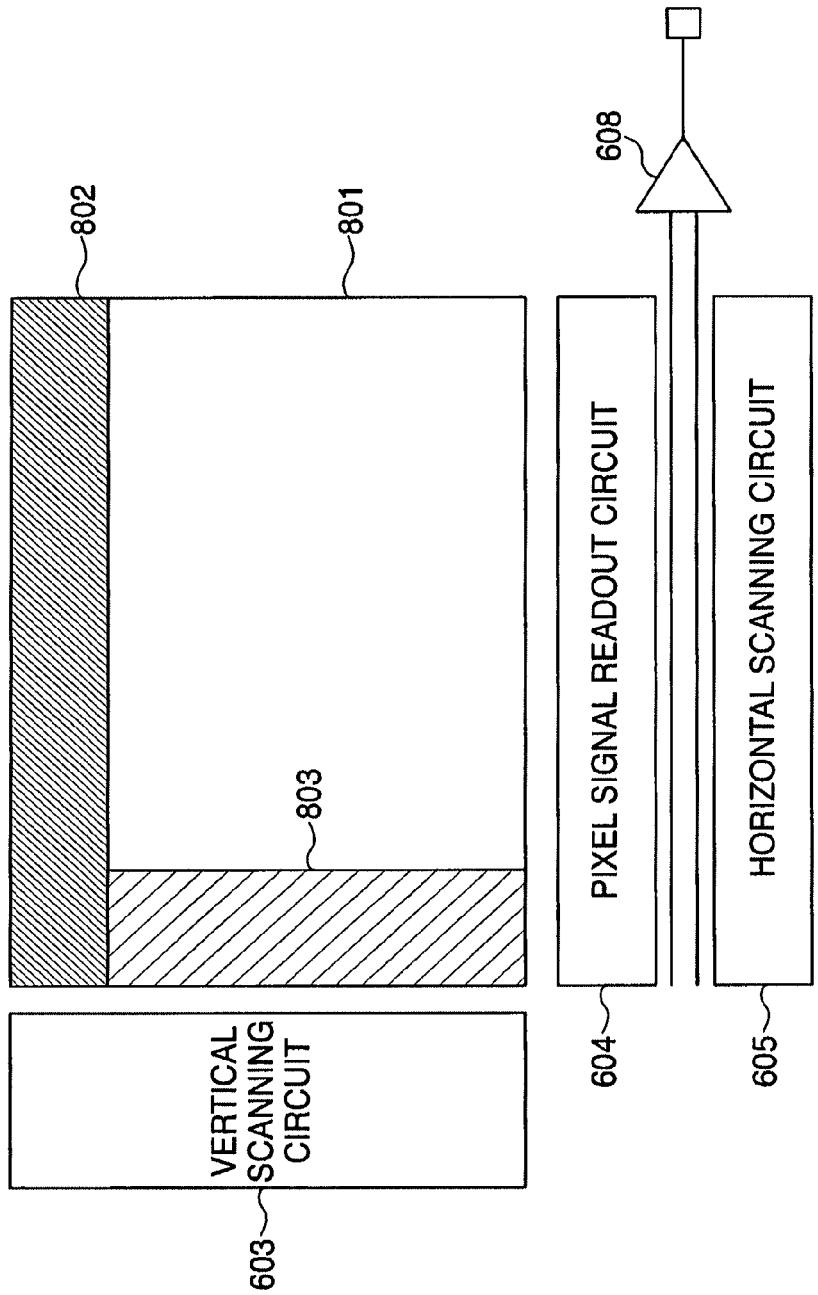

IMAGE PICKUP APPARATUS HAVING A DUMMY SIGNAL READOUT CIRCUIT

TECHNICAL FIELD

The present relates to an image pickup apparatus having pixels for converting an object image into electrical signals to thereby pick up the image.

BACKGROUND ART

An image pickup device for use in a digital single-lens reflex camera, a video camera, or the like has been downsized in terms of pixel size, and therefore an optical signal output from each one of pixels has become small. Thus, noise reduction has been increasingly demanded so as not to lower the S/N ratio.

FIG. 13 schematically shows in block diagram the construction of an image pickup device (CMOS). As shown in FIG. 13, the image pickup device includes a pixel region 601 formed by a plurality of pixels 602 arranged in a two-dimensional matrix. In the pixel region 601, incoming optical signals from an object are converted into electrical signals (image pickup signals).

FIG. 14 shows the circuit construction of each one of the pixels 602. Referring to FIG. 14, a photodiode 701 of the pixel 602 receives a part of an optical image formed thereon by a photographing lens, not shown, and generates and stores an electric charge. The pixel 602 includes a transfer switch 702, a reset switch 703, an amplifier 704, and a selection switch 705 each of which is formed by an MOS transistor.

The transfer switch 702 has a gate thereof input with a corresponding one of drive signals tx1 to tx4 output from a vertical scanning circuit 603 of the image pickup device. The electric charge stored in the photodiode 701 is input via the transfer switch 702 to a gate of the amplifier 704 that converts the electric charge into a voltage which is output from a source follower. The gate of the amplifier 704 is reset by turning on (closing) the reset switch 703. The selection switch 705, when turned on, outputs a pixel signal to a corresponding one of vertical output lines H1 to H4 in FIG. 13.

Referring to FIG. 13 again, the vertical scanning circuit 603 outputs drive signals res1 to res4, tx1 to tx4, and sel1 to sel4 to the pixel region 601.

In accordance with the drive signals from the vertical scanning circuit 603, signal components S and noise components N are output from the pixels 602 of the pixel region 601 to the vertical output lines H1 to H4.

The vertical output lines H1 to H4 are connected to a readout circuit 604 of the image pickup device. The signal components S and the noise components N read out from the pixels 602 are temporarily held in the readout circuit 604.

The noise component is a pixel output, which is generated immediately after the reset switch 703 is turned on in accordance with the drive signal and which is then held in an N signal holding section of the readout circuit 604 via the amplifier 704, the selection switch 705, and a corresponding one of the vertical output lines H1 to H4 in a state that the transfer switch 702 is turned off. The noise component includes reset noise generated when the reset switch 703 is turned on, a variation between the pixels in gate-to-source voltage of the amplifiers 704, and so on.

The signal component is an electric charge, which is transferred from the photodiode 701 when the transfer switch 702 is turned on in accordance with the drive signal and held in an S signal holding section of the readout circuit 604. A noise component generated when the transfer switch 702 is turned on is added to the signal component.

Subsequently, a horizontal scanning circuit 605 of the image pickup device operates to output the signal component S and the noise component N to a differential amplifier 608 via respective ones of MOS transistors 606, 607.

A difference between the signal component S to which a noise component is added and the noise component N is amplified by and output from the differential amplifier 608, whereby a pixel output from which the noise component is removed can be obtained.

FIG. 15 shows the layout of the pixel region 601 of the image pickup device. As shown in FIG. 15, the pixel region 601 includes an effective pixel area 801 comprised of pixels for converting an image formed thereon by a photographing lens, not shown, into electrical signals. A VOB 802 is formed by light-shielded pixels and disposed adjacent to the effective pixel area 801 in the vertical direction. The VOB 802 is for detecting a black level and correcting an offset variation in the output of the image pickup device due to a variation in dark current component or a temperature variation.

An HOB 803 is formed by light-shielded pixels as in the case of the VOB 802, is disposed adjacent to the effective pixel area 801 in the horizontal direction, and is used for correcting a vertical dark shading component (see, for example, Japanese Laid-open Patent Publication No. 2000-152098).

A dark shading component can appear due to a dark current shading, and especially in a CMOS image pickup device, it appears due to a voltage shading caused by an impedance of a power supply line.

To detect offset values for respective lines from pixel data in the HOB region, it is necessary to use a sufficient number of pixel data large enough to eliminate affections by random noise and pixel defects. Since the offset values must be detected on a line-by-line basis, pixel data in preceding and subsequent lines cannot be used, and therefore an adequate HOB region must be ensured for each line. Thus, an extremely large number of pixels are required as a whole, which increases the chip area of the image pickup device and results in increase in the cost thereof.

DISCLOSURE OF INVENTION

The present invention provides an image pickup apparatus capable of obtaining a correction value effective for horizontal noise correction, while suppressing increase in chip area of an image pickup device.

According to the present invention, there is provided an image pickup apparatus including a plurality of pixels for photoelectrically converting an object image into pixel signals, the image pickup apparatus comprising a pixel signal readout circuit adapted to read out the pixel signals from the plurality of pixels on a line-by-line basis via vertical signal lines, a dummy signal readout circuit adapted to read out dummy signals, the dummy signal readout circuit not being connected to the plurality of pixels and the vertical signal lines, a horizontal scanning circuit adapted to transfer outputs of the pixel signal readout circuit and the dummy signal readout circuit, and a correcting section adapted to correct the outputs of the pixel signal readout circuit on a line-by-line basis using the outputs of the dummy signal readout circuit.

With this invention, a correction value effective for horizontal noise correction can be obtained, while suppressing increase in chip area of the image pickup device, whereby a high quality image can be obtained.

BRIEF DESCRIPTION OF DRAWINGS

FIG. 15 is a view schematically showing the layout of the conventional image pickup device.

BEST MODE FOR CARRYING OUT THE INVENTION

In the following, embodiments of an image pickup apparatus of this invention will be described with reference to the attached drawings.

First Embodiment

Figure 1:
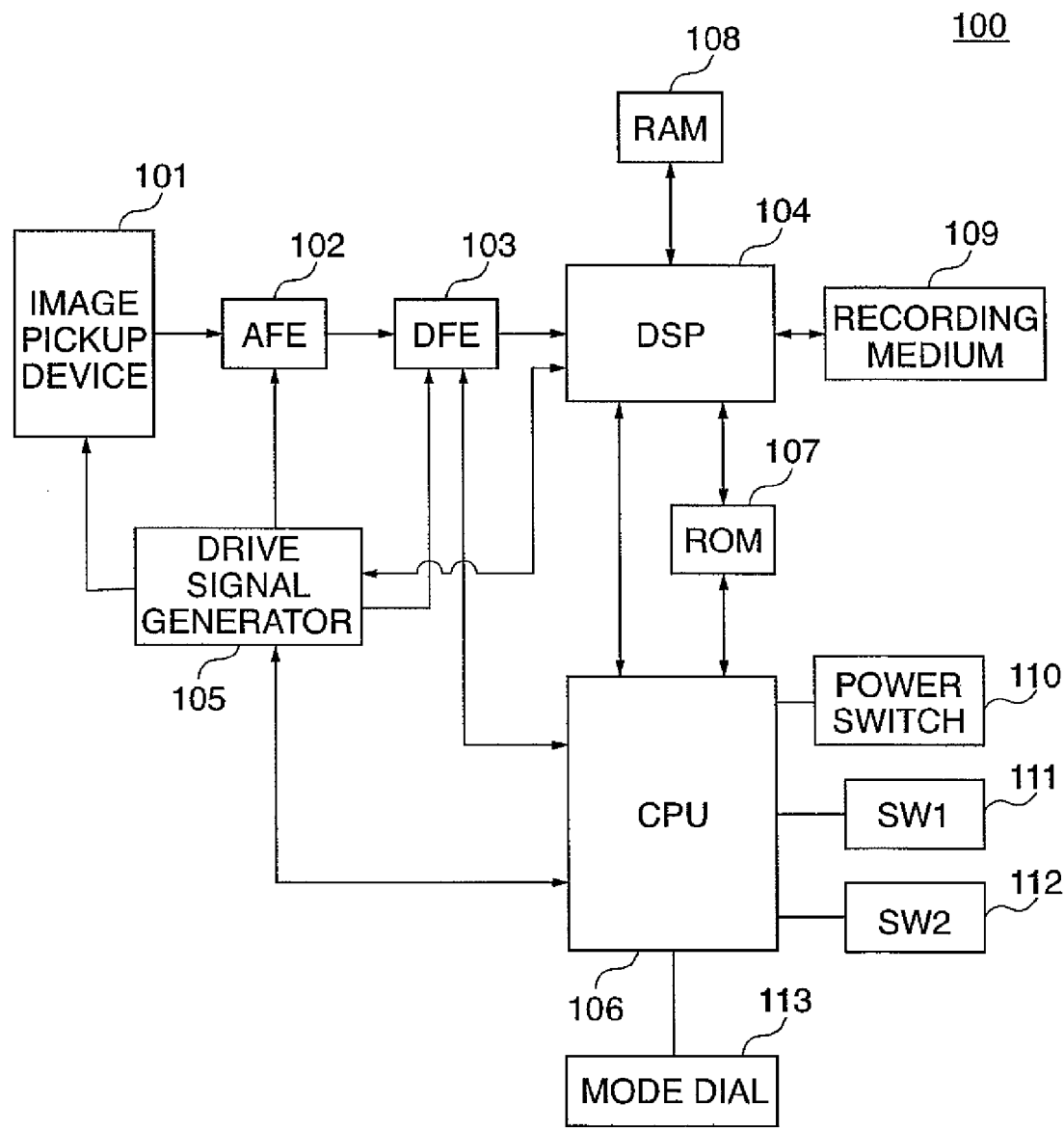
FIG. 1 is a block diagram schematically showing the construction of an image pickup apparatus according to a first embodiment of this invention.

FIG. 1 schematically shows in block diagram the construction of an image pickup apparatus according to a first embodiment of this invention.

Referring to FIG. 1, the image pickup apparatus 100 of this embodiment includes an image pickup device 101 having a plurality of pixels for photoelectrically converting an object image into electrical signals (image pickup signals). The image pickup device 101 is formed by a CMOS sensor. An analog front end (AFE) 102 has functions of performing analog-to-digital conversion, OB clamp, variable gain amplification, etc. on image pickup signals supplied from the image pickup device 101. OB clamp processing is for making an offset adjustment on the image pickup signals to obtain a predetermined level of output from a light shield section (optical black section) of the image pickup device 101.

A digital front end (DFE) 103 receives pixel digital outputs supplied from the AFE 102 and performs thereon digital processing such as image signal correction and pixel sorting.

A DSP (digital signal processor) 104 performs various correction processing and development processing on data (digital signals) supplied from the DFE 103. The DSP 104 also performs processing to control memories such as a ROM 107 and a RAM 108, processing to write image data into a recording medium 109, and other processing.

Under the control of a CPU 106, a drive signal generator 105 supplies drive signals such as a clock signal and a control signal to the image pickup device 101, the AFE 102, the DFE 103, and the DSP 104.

The CPU 106 controls the DSP 104 and the drive signal generator 105, and controls a camera function provided by a photoelectric controller and a distance measurement controller, both of which are not shown. The CPU 106 is connected with switches 110, 111, 112 and a mode dial 113, and performs processing in accordance with manipulation signals supplied from the switches and the mode dial.

The ROM 107 stores a control program, which is implemented by the CPU 106, and various correction data. The RAM 108 temporarily stores correction data and image data to be processed by the DSP 104. The RAM 108 is able to be accessed at a higher speed than to the ROM 107.

The recording medium 109 is implemented by, for example, a compact flash (registered trademark) card, is detachably mounted via a connector, not shown, to the image pickup apparatus 100, and stores photographed image data.

The power switch 110 is for starting the image pickup apparatus 100. The first shutter switch (SW1) 111 is for giving an instruction to start operations such as photometry processing and distance measurement processing. The second shutter switch (SW2) 112 is for giving an instruction to start a series of photographing operations for driving a mirror and a shutter, both of which are not shown, and for writing signals read from the image pickup device 101 into the recording medium 109 via the AFE 102, the DFE 103, and the DSP 104.

Figure 2:
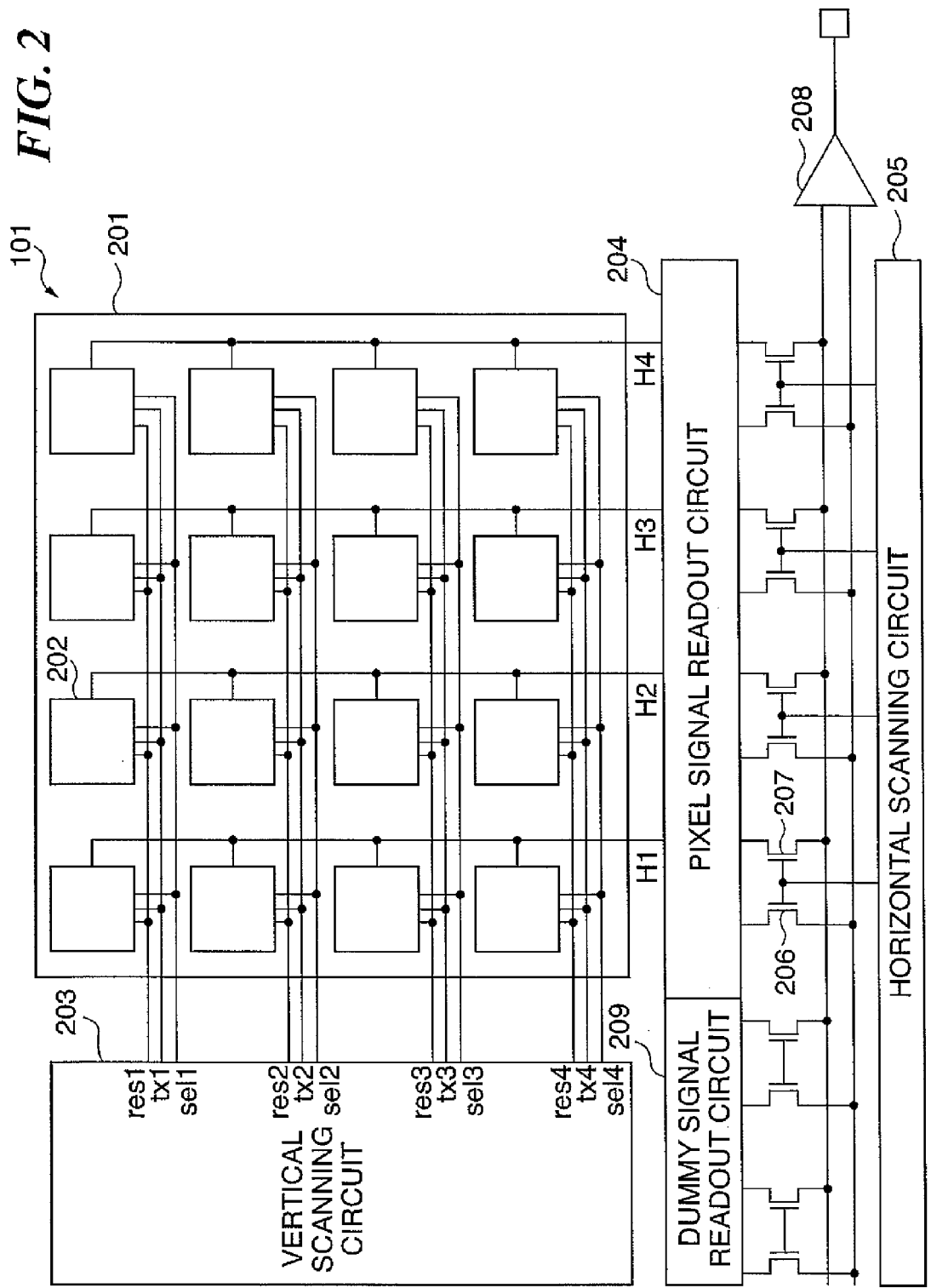
FIG. 2 is a block diagram schematically showing the construction of an image pickup device.
Figure 13:
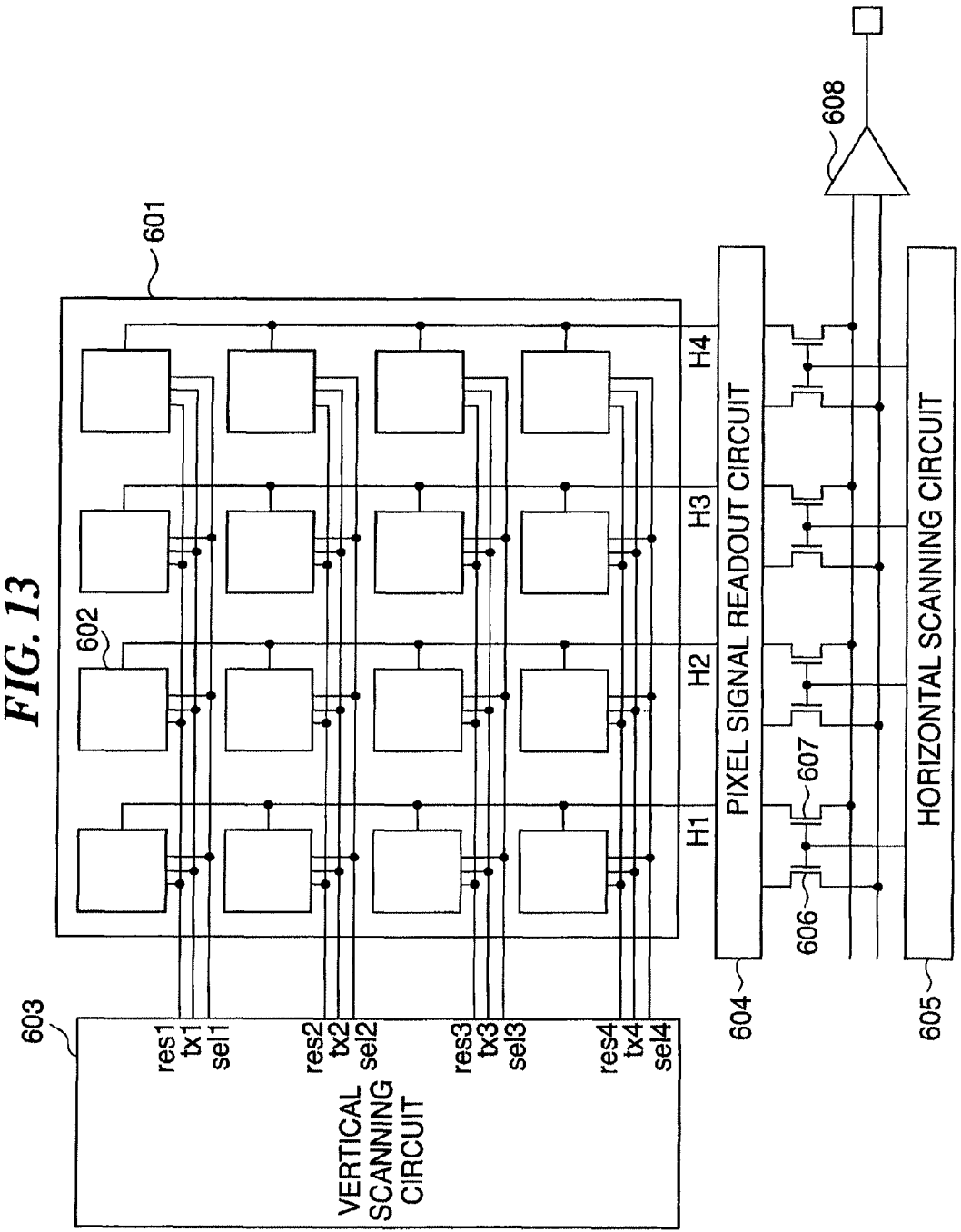
FIG. 13 is a block diagram schematically showing the construction of a conventional image pickup device.
Figure 14:
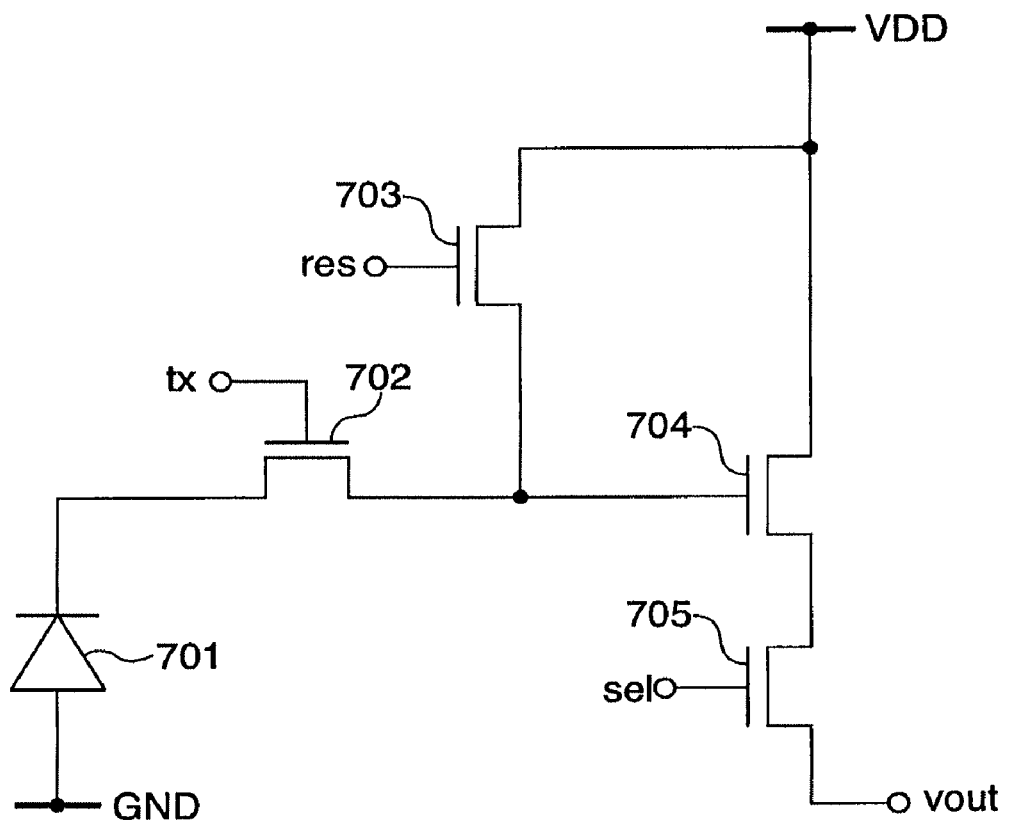
FIG. 14 is a circuit diagram showing the construction of each one of pixels of the conventional image pickup device.

FIG. 2 schematically shows in block diagram the construction of the image pickup device 101, which is the same as that of the image pickup device already described with reference to FIG. 13. A pixel region 201 is comprised of a plurality of pixels 202 disposed in a two-dimensional matrix. The circuit construction of the pixel 202 is the same as that described with reference to FIG. 14, and therefore like parts are denoted by like numerals in the following description.

A vertical scanning circuit (control circuit) 203 is annexed to the pixel region 201, and outputs drive signals res1 to res4, tx1 to tx4 and sel1 to sel4 to the pixel region 201. In accordance with the drive signals from the vertical scanning circuit 203, signal components S and noise components N are output from the respective pixels 202 of the pixel region 201. The signal components S and the noise components N are supplied via vertical output lines (vertical signal lines) H1 to H4 to respective ones of S signal holding sections and N signal holding sections of a pixel signal readout circuit 204, and held therein.

Figure 3:
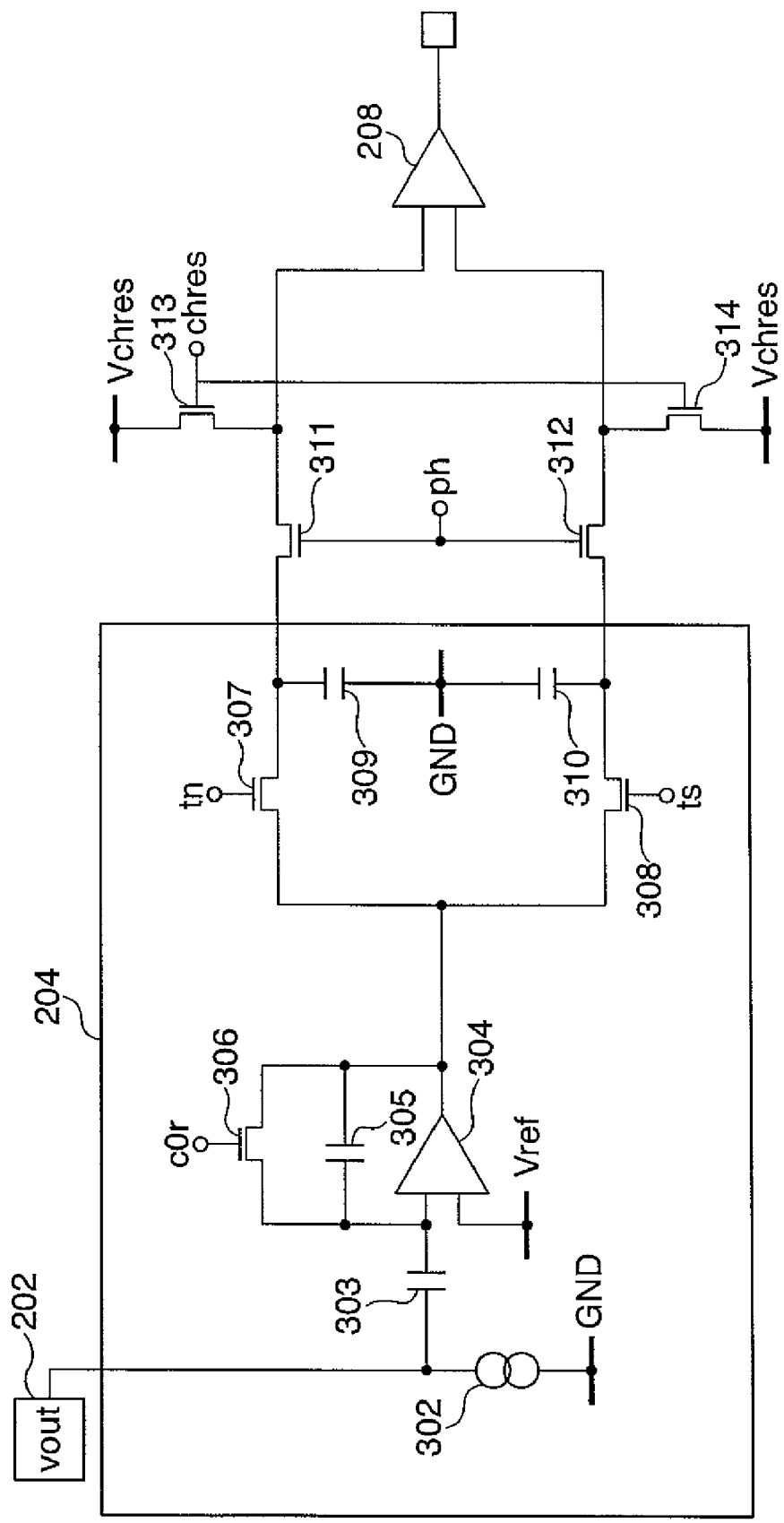
FIG. 3 is a circuit diagram showing in detail the construction of a pixel signal readout circuit of the image pickup device.

FIG. 3 shows the circuit construction of that part of the pixel signal readout circuit 204 corresponding to one of the pixel columns of the pixel region 201. As shown in FIG. 3, the pixel signal readout circuit 204 has an input side thereof connected to the corresponding vertical output line to which is supplied an output vout from the pixels 202 of the corresponding pixel column.

Figure 4:
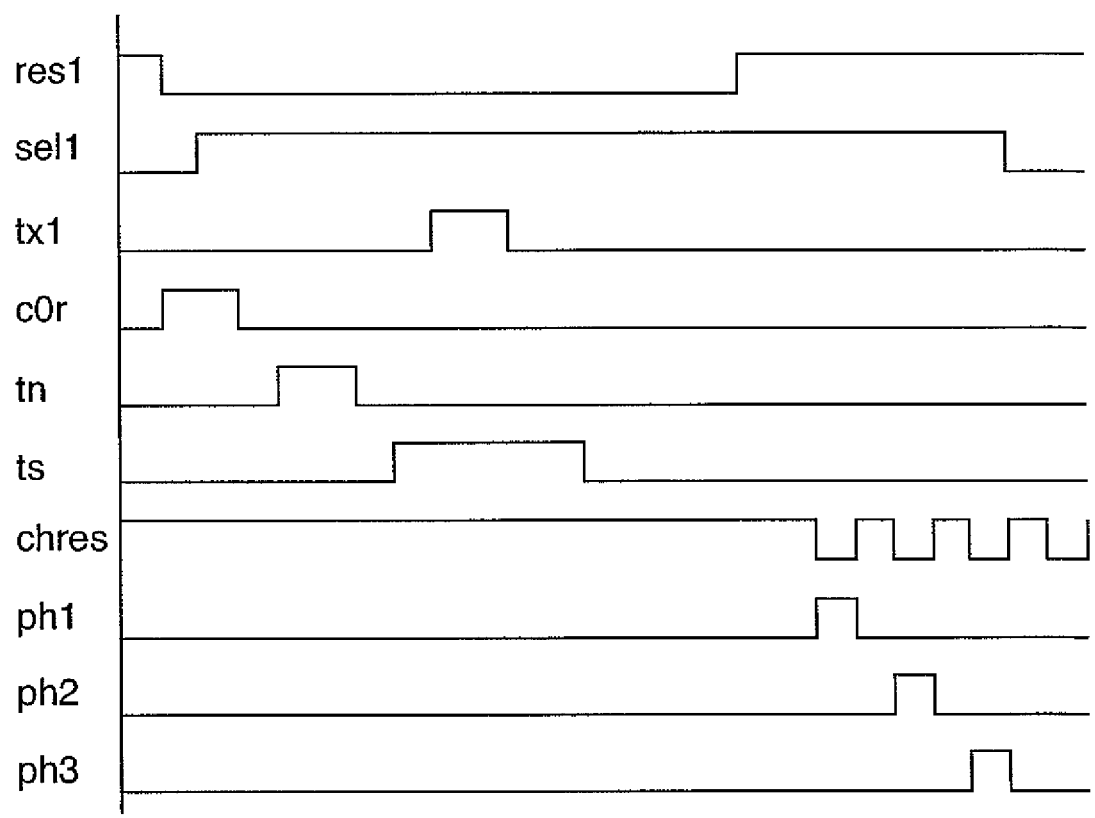
FIG. 4 is a timing chart showing an exemplar image signal readout operation of the image pickup device.

FIG. 4 shows in timing chart an example of operation of the image pickup device 101. Prior to transfer of electric charges which are stored in the photodiodes 701 (see FIG. 14) of the pixels 202 in the first line of the pixel region 201, the drive signal res1 is made high level as shown in FIG. 4, to thereby turn on the reset switches 703 of the pixels 202 of the first line to reset the gates of the amplifiers 704.

Next, the drive signal res1 is made low level and at the same time, clamp switches 306 of the pixel signal readout circuit 204 are turned on in accordance with a drive signal c0r. Subsequently, the drive signal sel1 is input to the gates of the selection switches 705 of the pixels 202 to turn on the selection switches 705. As a result, the pixel outputs on which reset noise is superimposed are supplied via the vertical output lines to and clamped by clamp capacities 303 of the respective columns. An electric current source 302 is connected to the corresponding vertical output line.

Next, the clamp switches 306 are turned off and a drive signal tn is made high level, whereby N signal transfer switches 307 are turned on. Thus, N signals amplified by amplifiers 304 and feedback capacities 305 of the respective columns are held in N signal holding capacities 309.

After the N signal transfer switches 307 are turned off, a drive signal ts is made high to turn on S signal transfer switches 308, and in this state the drive signal tx1 is made high. As a result, electric charges stored in the photodiodes 701 are transferred by the transfer switches 702, whereby optical signals are read out to the vertical output lines. After the transfer switches 702 are turned off, the S signal transfer switches 308 are turned off, whereby the S signals are held in S signal holding capacities 310.

With the above described operation, the S signals and the N signals supplied from the pixels 202 of the first line of the pixel region 201 are respectively held in the holding capacities 309, 310 of the respective columns. If power source noise is produced or external noise is applied to signal lines between a timing of the S signals being held and a timing of the N signals being held, different noise components are respectively superimposed on the S signals and the N signals.

Figure 5:
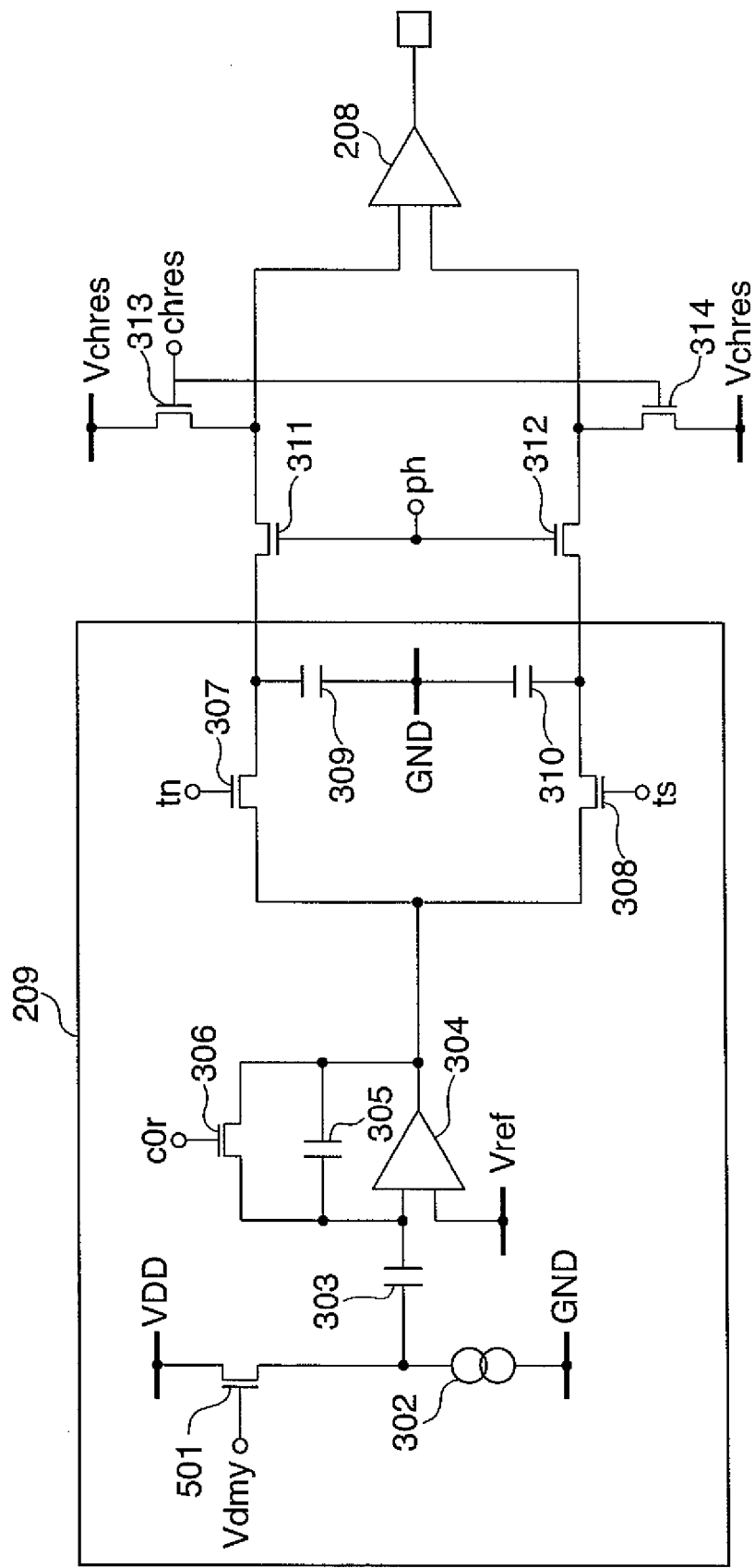
FIG. 5 is a circuit diagram showing in detail the construction of a dummy signal readout circuit of the image pickup device.

Referring to FIG. 2 again, there is provided a dummy signal readout circuit 209 that includes a plurality of columns. FIG. 5 shows the circuit construction of that part of the dummy signal readout circuit 209 corresponding to one of the columns. The dummy signal readout circuit 209 includes a sufficient number of columns large enough for the below-described horizontal noise correction to remove affections by random noise.

Most parts of the dummy signal readout circuit 209 shown in FIG. 5 are the same in construction as the pixel signal readout circuit 204 in FIG. 3, but are different in that, unlike the pixel signal readout circuit 204, the input side of the dummy signal readout circuit 209 is not connected to the vertical output lines and the pixels, but is connected to a dummy amplifier 501.

The dummy amplifier 501 is an MOS transistor having a gate thereof fixed at a voltage Vdmy and a drain thereof applied with a power source voltage VDD. Specifically, the input signal supplied to the dummy signal readout circuit 209 is at a fixed electric potential which is alternative to the amplifier 704 of the pixel 202. The voltage Vdmy is equivalent to a voltage appearing immediately after the gate of the amplifier 704 of the pixel 202 is reset. The construction of the dummy signal readout circuit 209 on the input side is not limited to the above described construction, but may be a construction in which a constant voltage is simply input to the clamp capacity 303, for example.

The clamp switch 306, the N signal transfer switch 307, and the S signal transfer switch 308 are respectively controlled in accordance with the same drive signals as those used in the pixel signal readout circuit 204.

Thus, the N signal is read out in timing which is the same as the timing in which the N signal is read out in the pixel signal readout circuit 204, and is then held in the N signal holding capacity 309. The S signal is read out in timing which is the same as the timing in which the S signal is read out in the pixel signal readout circuit 204, and is then held in the S signal holding capacity 310. Power source noise or other noise generated in these holding timings is therefore superimposed on respective ones of the S signal and the N signal as in the case of the pixel signal readout circuit 204.

Subsequently, a signal ph supplied from a horizontal scanning circuit 205 is made high, whereby horizontal transfer switches 311, 312 of the respective columns of the pixel signal readout circuit 204 in FIG. 3 are sequentially turned on, and horizontal transfer switches 311, 312 of the respective columns of the dummy signal readout circuit 209 in FIG. 5 are sequentially turned on. As a result, voltages held in the N signal holding capacities 309 and the S signal holding capacities 310 of the respective columns of the readout circuits 204, 209 are sequentially read out to horizontal output lines, are differential-processed by differential amplifiers 208 in sequence, and are sequentially output to output terminals thereof. The horizontal transfer switches 311, 312 respectively correspond to switches 206, 207 in FIG. 2.

With the differential processing, reset noise generated when the reset switches 703 are turned on, noise due to a variation between the pixels in the gate-to-source voltage of the amplifiers 704, and other noise are canceled as described previously. However, noise caused by the difference between the timing of the S signals being held and the timing of the N signals being held is not canceled and therefore mixed in the signals output from the output terminals.

With regard to the order of reading out the signals of the respective columns by the horizontal scanning circuit 205, the readout is carried out from an endmost column of the dummy signal readout circuit 209 in FIG. 2. Upon completion of readout operation for signals of all the columns of the dummy signal readout circuit 209, signals are read out from all the columns of the pixel signal readout circuit 204 in the order from endmost column thereof. Between the signal readouts from the respective columns, horizontal output line voltages are reset to a reset voltage Vchres by horizontal output line reset switches 313, 314.

With the above, the operation for reading out the signals of the first line is completed. Upon completion of reading out the signals of the first line, an operation for reading out signals of the second line is started in accordance with a drive signal from the vertical scanning circuit 203. In that case, pixel signals from the pixels 202 of the respective columns in the second line of the pixel region 201 are output via the pixel signal readout circuit 204. The dummy signal readout circuit 209 repeats the operation which is the same as that for the first line.

Thereafter, operations for reading out signals from the third line and the subsequent lines are sequentially carried out. When pixel signals are read out from all of the pixels of the pixel region 201, the readout operation of the image pickup device 101 is completed.

Figure 6:
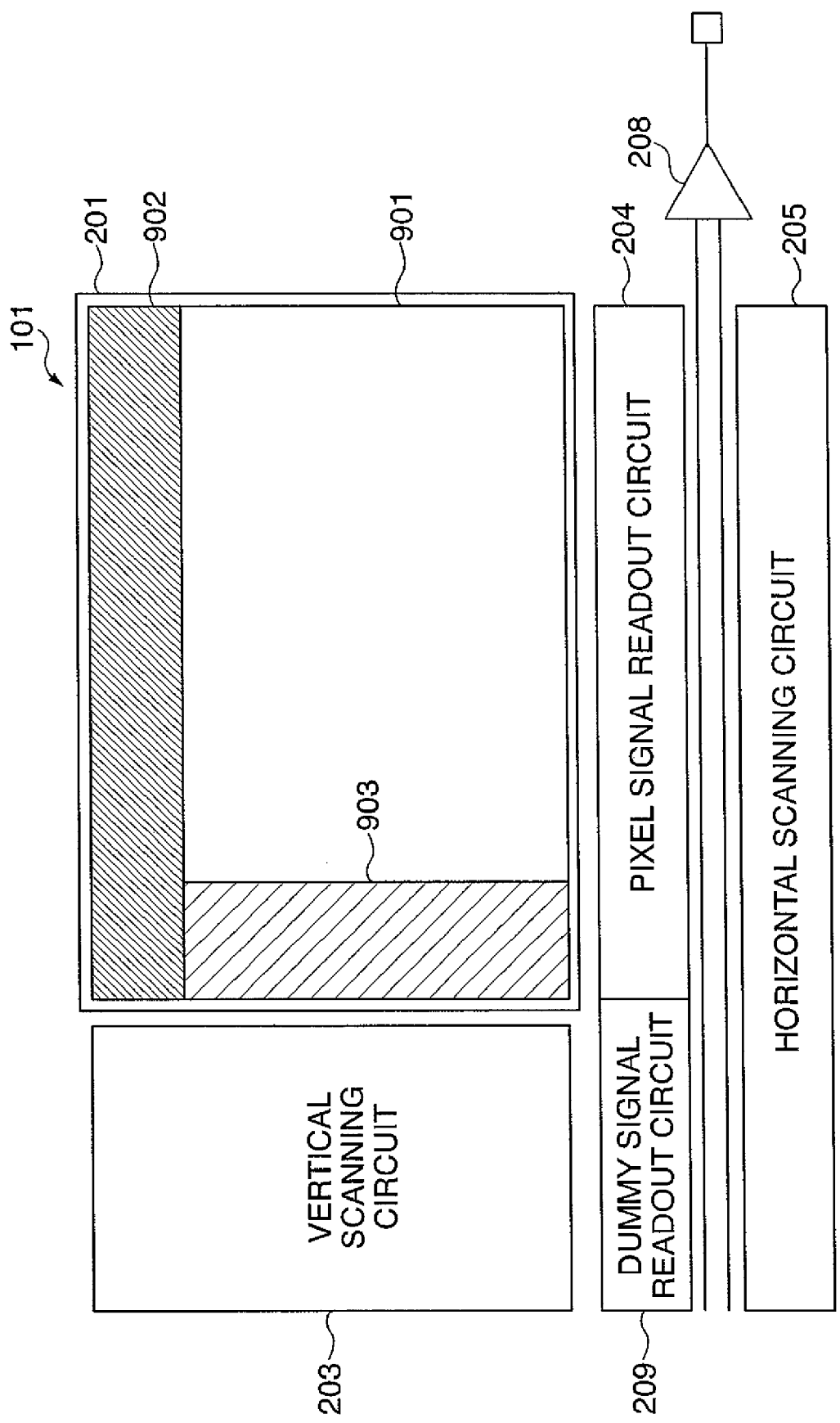
FIG. 6 is a view showing the layout of a pixel region and its peripheral circuits of the image pickup device.

FIG. 6 shows the layout of the pixel region 201 and its peripheral circuits of the image pickup device 101. An effective pixel area 901, a VOB 902, and a HOB 903 in FIG. 6 are the same as the effective pixel area 801, the VOB 802, and the HOB 803 already described with reference to FIG. 15, and therefore a description thereof will be omitted.

The vertical scanning circuit 203 is disposed adjacent to the pixel region 201 in the horizontal direction, and the pixel signal readout circuit 204 is disposed adjacent to and below the pixel region 201 in the vertical direction. The dummy signal readout circuit 209 is disposed adjacent to the pixel signal readout circuit 204 in the horizontal direction and below the vertical scanning circuit 203 in the vertical direction.

Thus, the dummy signal readout circuit 209 is disposed on the side opposite from the differential amplifier 208 with respect to the pixel signal readout circuit 204. The horizontal scanning circuit 205 is disposed below the dummy readout circuit 209 and the pixel signal readout circuit 204 in the vertical direction.

Referring to FIG. 1 again, signals output from the image pickup device 101 are subjected to analog-to-digital conversion and other processing in the AFE 102 and then input to the DFE (correcting section) 103 in which the signals are subjected to horizontal noise correction.

Figure 7:
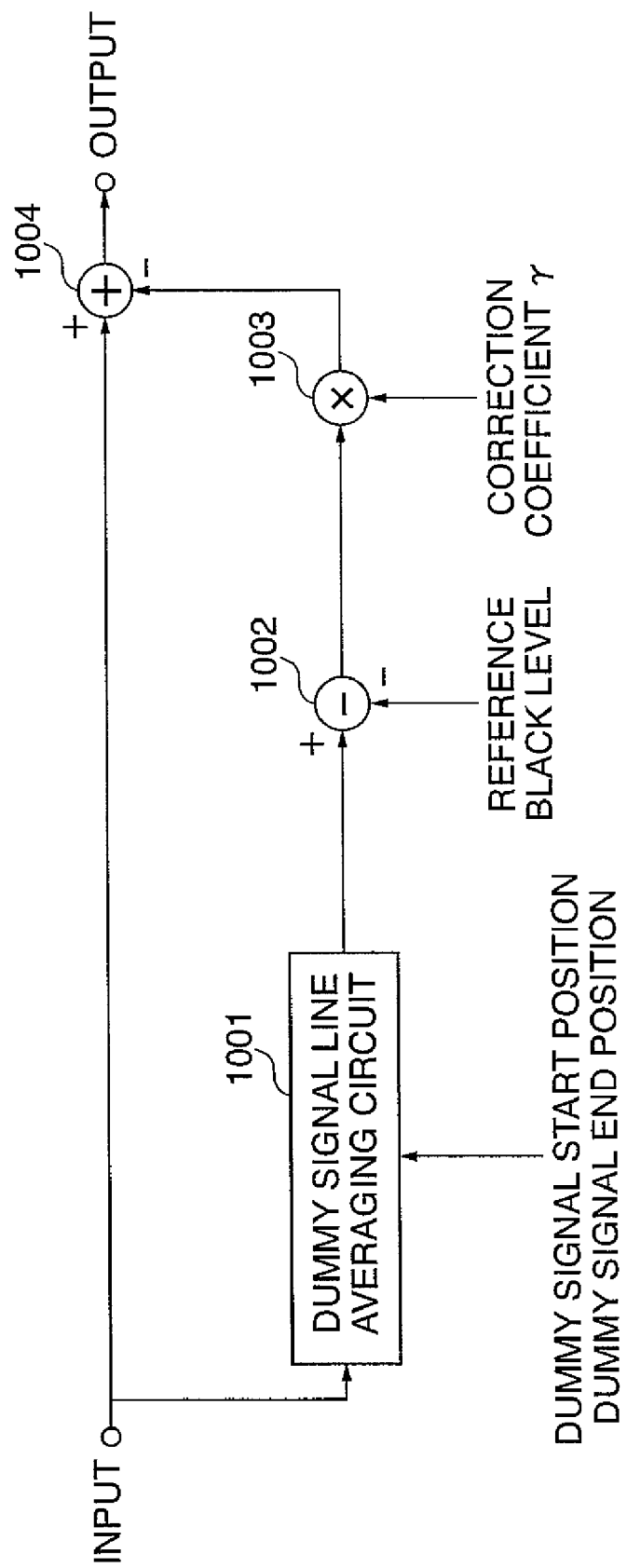
FIG. 7 is a block diagram showing the internal construction of a DFE.

FIG. 7 shows in block diagram that part of the internal construction of the DFE 103 relating to the horizontal noise correction.

Referring to FIG. 7, a dummy signal line averaging circuit 1001 is for averaging dummy signals on a line-by-line basis. The circuit 1001 carries out digital addition/averaging processing in accordance with start and end positions of dummy signals which are set in a register, not shown. A subtractor 1002 carries out differential processing based on an output from the averaging circuit 1001 and a reference black level, to thereby calculate an amount of error between a dummy signal line average value and the reference black level.

A multiplier 1003 multiplies the error amount output from the subtractor 1002 by a predetermined coefficient γ (0<γ≦1), thereby calculating an offset correction amount (correction value). The correction value calculated by the multiplier 1003 is input to a subtractor 1004, in which the correction value is subtracted from respective pixel outputs. With the above construction, horizontal noise correction can be realized.

With the horizontal noise correction of this embodiment, the dummy signal level is made equivalent to the reference black level. Depending on cases, the dummy signal level differs from a signal level in the OB (optical black) section. In that case, a difference between a signal level in the VOB and the dummy signal level may be detected by the DFE 103 or the DSP 104, and offset correction may uniformly be made on all the pixel outputs to make the signal level in the OB section equivalent to the reference black level.

As describe above, in this embodiment, the horizontal noise correction can be carried out on the signals output from the image pickup device 101, without increasing the number of pixels of the HOB 903. As a result, an effective correction value can be obtained to attain a high quality image, while suppressing the increase in chip area of the image pickup device 101.

Second Embodiment

Next, with reference to FIGS. 8 to 10, an image pickup apparatus according to a second embodiment of this invention will be described. In the following, like parts corresponding to those of the first embodiment are denoted by like numerals.

In this embodiment, dummy signal line averaging processing is carried out in an analog fashion by the image pickup device 101.

Figure 8:
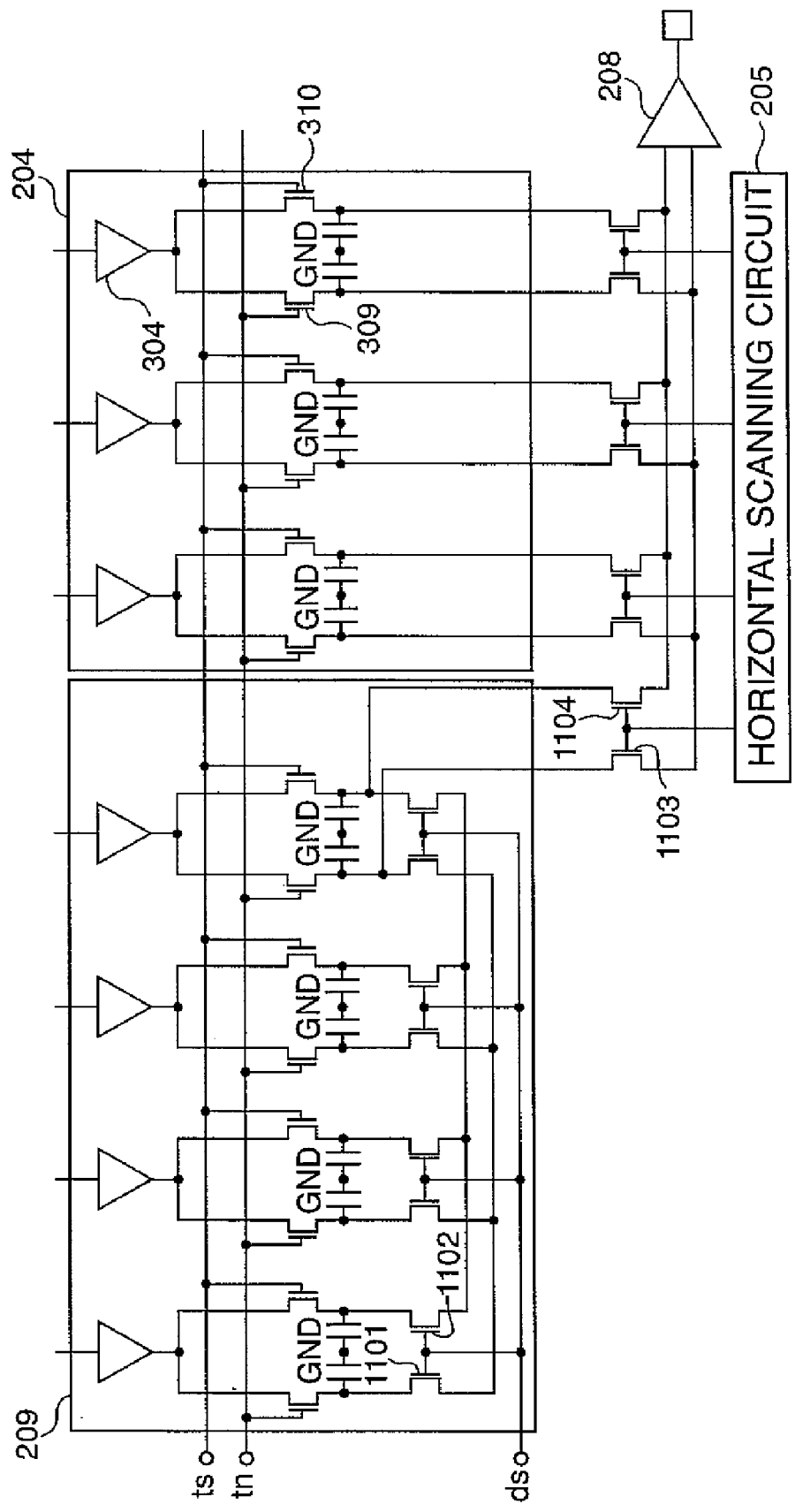
FIG. 8 is a circuit diagram schematically showing the construction of an image signal readout circuit and a dummy signal readout circuit of an image pickup device of an image pickup apparatus according to a second embodiment of this invention.

FIG. 8 shows a part of the image pickup device 101 of this embodiment (part of the pixel signal readout circuit 204, part of the dummy signal readout circuit 209, the horizontal scanning circuit 205, and the differential amplifier 208). As for the dummy signal readout circuit 209 and the image signal readout circuit 204, those parts corresponding to the amplifier 304 and the latter stage thereof are shown in FIG. 8, with illustration of the other parts omitted.

N signal short switches 1101 are for shorting out the N signal holding capacities 309 of the respective columns in the dummy signal readout circuit 209. S signal short switches 1102 are for shorting out the S signal holding capacities 310 of the respective columns in the dummy signal readout circuit 209. Both the N signal short switches 1101 and the S signal short switches 1102 are turned on and off in accordance with a drive signal ds.

Horizontal transfer switches 1103, 1104 are connected to that column of the dummy signal readout circuit 209 which is disposed closest to the pixel signal readout circuit 204, and have functions similar to those of the horizontal transfer switches 311, 312 in FIG. 5.

Figure 9:
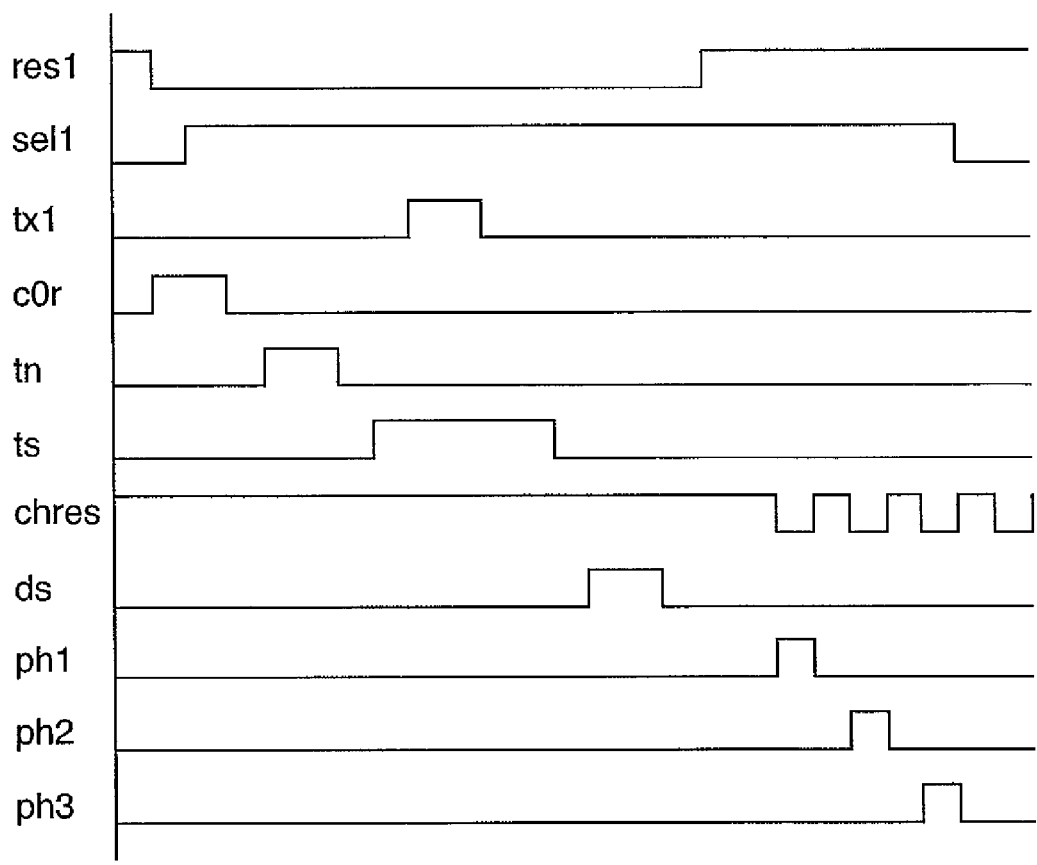
FIG. 9 is a timing chart for explaining an exemplar image signal readout operation of the image pickup device.

FIG. 9 shows in timing chart an example of operation of the image pickup device 101. As shown in FIG. 9, the same operations as those in the first embodiment are performed up to the timing of S signal holding performed in accordance with the drive signal ts. At this point of time, S signals and N signals are respectively held in the S signal holding capacities 309 and the N signal holding capacities 310.

Next, the drive signal ds is made high level to turn on the N signal short switches 1101 and the S signal short switches 1102 of the dummy signal readout circuit 209. Subsequently, the drive signal ds is made low level again, thereby turning off the N signal short switches 1101 and the S signal short switches 1102. With this operation, the N signals and the S signals of each column of the dummy signal readout circuit 209 are respectively averaged.

Next, the horizontal scanning circuit 205 is operated to sequentially read out the S signals and the N signals. First, the horizontal transfer switches 1103, 1104 are turned on to thereby read out the S signal and the N signal from that column of the dummy signal readout circuit 209 which is closest to the pixel signal readout circuit 204. Subsequently, the S signals and the N signals are sequentially read out from other columns of the pixel signal readout circuit 204.

As in the case of the first embodiment, pixel signals output from the image pickup device 101 are subjected to the analog-to-digital conversion and other processing by the AFE 102 and then subjected to the horizontal noise correction by the DFE 103.

Figure 10:
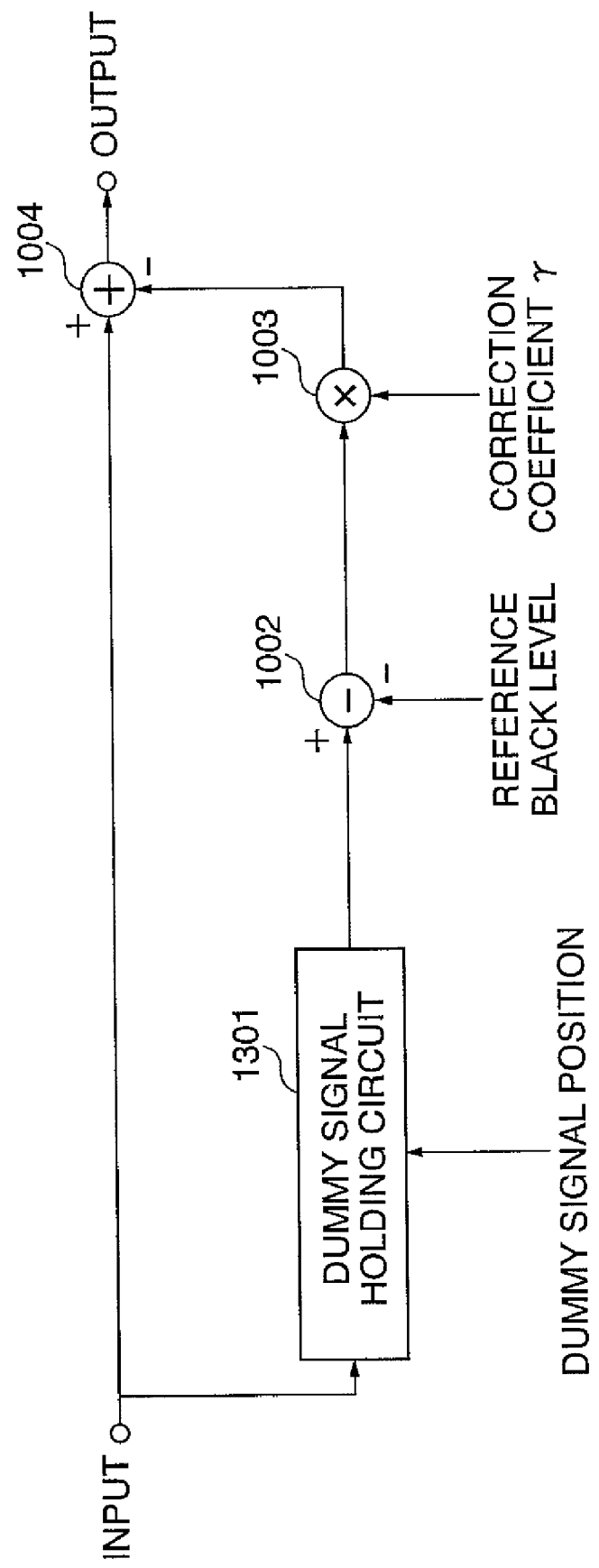
FIG. 10 is a block diagram showing the internal construction of a DFE.

FIG. 10 shows the construction of a horizontal noise correcting section. As shown in FIG. 10, the horizontal noise correction section only differs from that of the first embodiment (see FIG. 7) in that it includes a dummy signal holding circuit 1301. Since a single pixel's dummy signal is output from the image pickup device 101 on a line-by-line basis, the dummy signal line averaging circuit 1001 in FIG. 7 is unnecessary, but only requires a memory able to hold the single pixel's dummy signal. The timing in which the dummy signal is held is instructed in accordance with a value, which is set in a register, not shown.

As described above, the dummy signal averaging processing in this embodiment is carried out by the image pickup device 101 in an analog fashion. Thus, the dummy signal output from the image pickup device 101 is comprised of one pixel per one line, making it possible to reduce the number of output data.

The circuit scale of the horizontal scanning circuit 205 can therefore be reduced by the degree of reduction in the number of output data, and operation speeds of the image pickup device 101, the AFE 102, the DFE 103, and the DSP 104 can be moderated. In addition, the horizontal noise correcting section of the DFE 103 can be realized with a simplified construction such as a single pixel's memory, without using the line averaging circuit. Other constructions, functions, and advantages are similar to those of the first embodiment.

Third Embodiment

Figure 11:
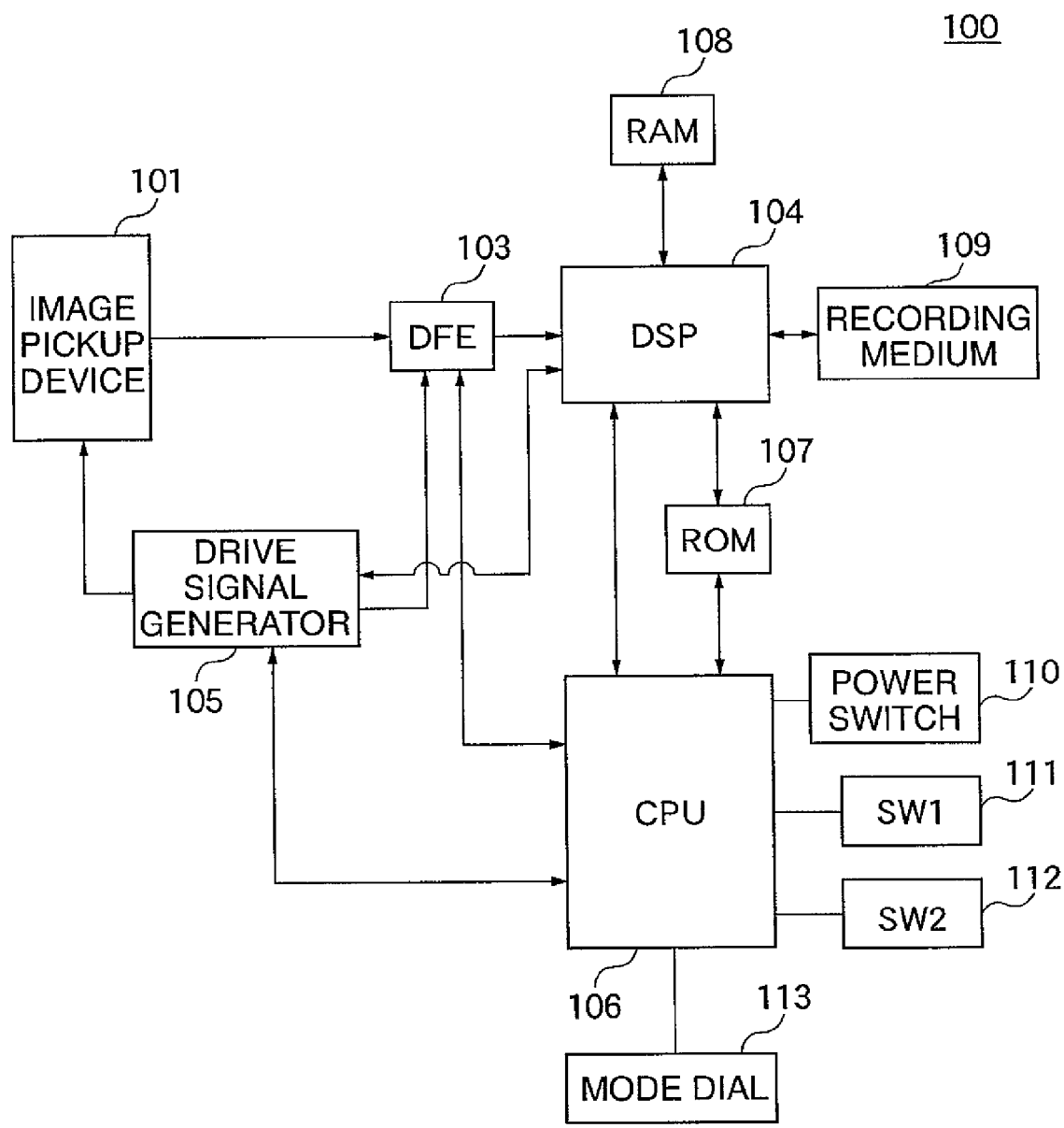
FIG. 11 is a block diagram for explaining the schematic construction of an image pickup apparatus according to a third embodiment of this invention.

Next, with reference FIGS. 11 and 12, an image pickup apparatus according to a third embodiment of this invention will be described. FIG. 11 schematically shows in block diagram the construction of the image pickup apparatus of the third embodiment. In the following, like parts corresponding to those of the first embodiment are denoted by like numerals.

In this embodiment, the image pickup device 101 includes an A/D conversion circuit (analog-to-digital conversion circuit) and a horizontal noise correcting section. An output from the image pickup device 101 is therefore supplied directly to the DEF 103, without the intervention of the AFE 102.

Figure 12:
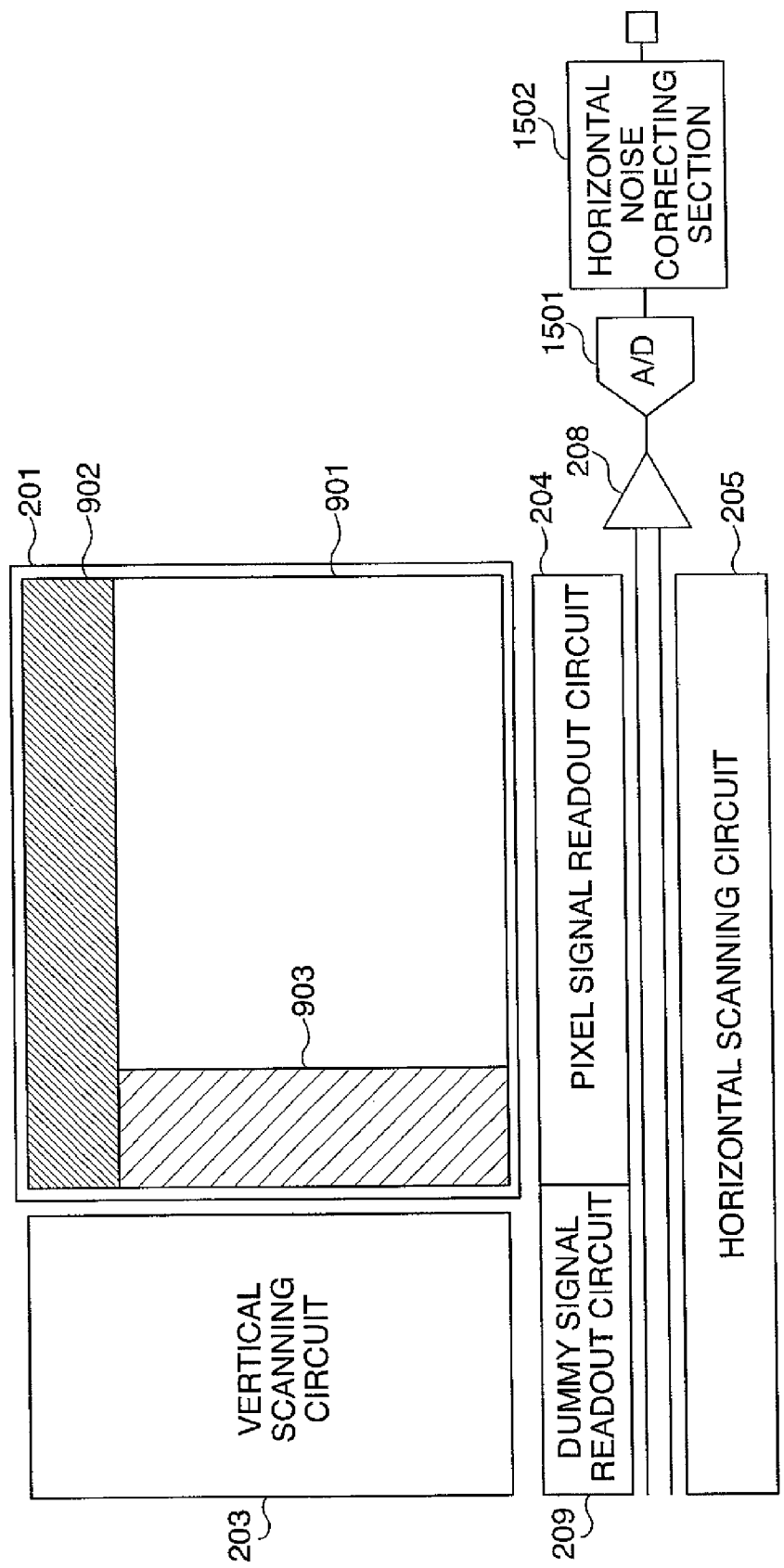
FIG. 12 is a view showing the layout of a pixel region and its peripheral circuits of an image pickup device.

FIG. 12 shows the layout of the pixel region 201 and its peripheral circuits of the image pickup device 101 of this embodiment.

As shown in FIG. 12, in the construction of this embodiment, an A/D converter 1501 for performing analog-to-digital conversion on an output of the differential amplifier 208 and a horizontal noise correcting section 1502 for correcting an output of the A/D converter 1501 are added to the image pickup device of the first embodiment.

The horizontal noise correcting section 1502 is comprised only of a logic circuit and incorporates the circuit construction in FIG. 7 as it is. After subjected to the horizontal noise correction in the horizontal noise correcting section 1502, pixel outputs are output from the image pickup device 101 to the DFE 103.

As described above, in this embodiment, the pixel outputs are output after completion of the horizontal noise correction thereon by the image pickup device 101, and it is therefore unnecessary to perform the horizontal noise correction in the DFE 103 or the DSP 104.

As an alternative to this embodiment, there may be used an image pickup device of a column AD system having A/D converter circuits for respective columns, if the image pickup device 101 has an incorporated A/D conversion function. In that case, outputs of the dummy signal readout circuit 209 and the pixel signal readout circuit 204 may be input to the A/D converter circuits for the respective columns, and may be corrected in a horizontal noise correcting section at a subsequent stage thereof. Other constructions, functions, and advantages are similar to those of the first embodiment.

In the above described embodiments, the dummy signal readout circuit 209 is disposed below the vertical scanning circuit 203, but may be disposed thereabove.

INDUSTRIAL APPLICABILITY

According to an image pickup apparatus of this invention, a correction value effective for horizontal noise correction can be obtained, while suppressing the increase in chip area of the image pickup device, whereby a high quality image can be obtained.

The invention claimed is:

1. An image pickup apparatus having a plurality of pixels for photoelectrically converting an object image into pixel signals, the image pickup apparatus comprising;
    a vertical scanning circuit adapted to output driving signals to the plurality of pixels;
    a pixel signal readout circuit adapted to read out the pixel signals from the plurality of pixels on a line-by-line basis via vertical signal lines;
    a dummy signal readout circuit adapted to read out dummy signals, said dummy signal readout circuit not being connected to the plurality of pixels and the vertical signal lines;
    a horizontal scanning circuit adapted to transfer outputs of said pixel signal readout circuit and said dummy signal readout circuit; and
    a correcting section adapted to correct the outputs of said pixel signal readout circuit on a line-by-line basis using the outputs of said dummy signal readout circuit,
    wherein said dummy signal readout circuit is disposed between said vertical scanning circuit and said horizontal scanning circuit.

2. The image pickup apparatus according to claim 1, wherein said dummy signal readout circuit is disposed above or below said vertical scanning circuit.

3. The image pickup apparatus according to claim 1, wherein said dummy signal readout circuit is disposed adjacent to said pixel signal readout circuit.

4. The image pickup apparatus according to claim 1, wherein input signals to said dummy signal readout circuit are at a fixed electrical potential.

5. The image pickup apparatus according to claim 1, wherein said dummy signal readout circuit is the same as said pixel signal readout circuit in construction with exception of an input side.

6. The image pickup apparatus according to claim 1, further comprising a dummy signal line averaging circuit adapted to average the dummy signals on a line-by-line basis.

* * * * *